United States Patent
Itoh

(10) Patent No.: US 12,457,427 B2
(45) Date of Patent: Oct. 28, 2025

(54) INFORMATION PROCESSING APPARATUS, METHOD, MEDIUM, AND SYSTEM FOR COLOR CORRECTION

(71) Applicant: CANON KABUSHIKI KAISHA, Tokyo (JP)

(72) Inventor: Yasuhiro Itoh, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 448 days.

(21) Appl. No.: 18/057,073

(22) Filed: Nov. 18, 2022

(65) Prior Publication Data

US 2023/0164451 A1   May 25, 2023

(30) Foreign Application Priority Data

Nov. 24, 2021  (JP) ................. 2021-190189

(51) Int. Cl.
  *G06K 9/00*  (2022.01)
  *G06T 7/90*  (2017.01)
  *H04N 23/88*  (2023.01)
(52) U.S. Cl.
  CPC ............... *H04N 23/88* (2023.01); *G06T 7/90* (2017.01); *G06T 2207/10024* (2013.01)
(58) Field of Classification Search
  CPC ... G06T 2207/10024; G06T 7/90; G06T 5/50; H04N 23/88; H04N 23/843
  See application file for complete search history.

(56) References Cited

U.S. PATENT DOCUMENTS

| | | | | |
|---|---|---|---|---|
| 2006/0056516 A1* | 3/2006 | Hamamatsu | ........... | H04N 19/51 375/240.18 |
| 2007/0177029 A1* | 8/2007 | Wada | ..................... | H04N 9/646 348/222.1 |
| 2017/0026552 A1* | 1/2017 | Tomono | ................. | G06V 10/56 |
| 2021/0076019 A1* | 3/2021 | Fujiwara | ............... | H04N 9/646 |
| 2024/0223763 A1* | 7/2024 | Nishiyama | ............ | H04N 5/783 |

FOREIGN PATENT DOCUMENTS

JP       2020009162 A   *   1/2020

\* cited by examiner

*Primary Examiner* — Gregory A Morse
*Assistant Examiner* — Owais Iqbal Memon
(74) *Attorney, Agent, or Firm* — Canon U.S.A., Inc. IP Division

(57) ABSTRACT

An information processing apparatus acquires imaging parameters of a first imaging apparatus and a second imaging apparatus, and based on the imaging parameters, determines a number of first images to be captured by the first imaging apparatus and a number of second images to be captured by the second imaging apparatus. Further, the information processing apparatus acquires first color information included in the first images and second color information included in the second images, and based on the first color information and the second color information, generates color correction information for correcting a difference in color between the first and second images.

17 Claims, 14 Drawing Sheets

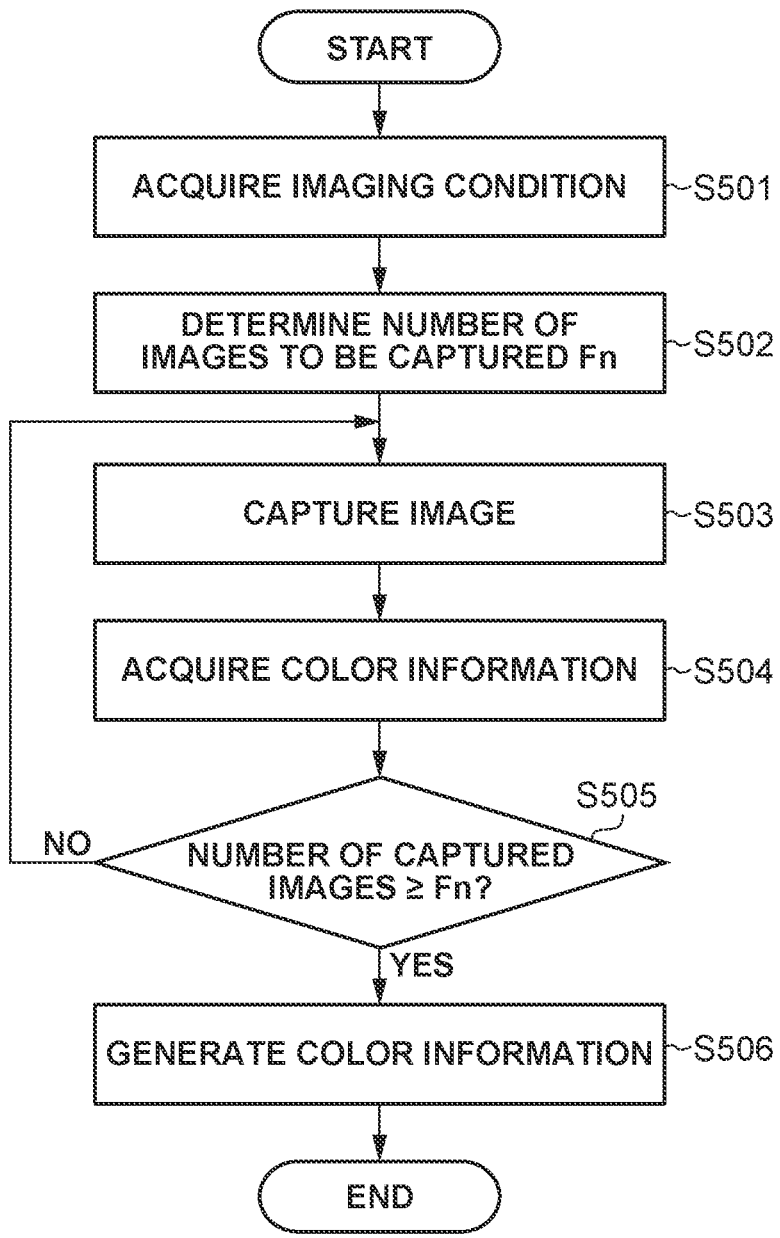

FIG. 6A

| RECORDING MODE/BIT RATE | Fn |
|---|---|
| MPEG-4 AVC/H.264　50Mbps | 4 |
| MPEG-4 AVC/H.264　225Mbps | 2 |
| H.265/HEVC | 2 |

FIG. 6B

| QUANTIZATION PARAMETER (Qp) | Fn |
|---|---|
| 0 | 1 |
| 10 | 2 |
| 20 | 4 |
| 30 | 8 |
| 40 | 16 |
| 50 | 32 |

FIG. 8A

| AREA | COLOR DATA |
|---|---|
| ① | (173,204,201) |
| ② | (224,168,113) |
| ③ | (103,173,217) |
| . | . |
| . | . |
| . | . |

FIG. 8B

| AREA | COLOR DATA |
|---|---|
| ① | (150,185,2187) |
| ② | (205,169,68) |
| ③ | (83,150,188) |
| . | . |
| . | . |
| . | . |

FIG. 8C

| AREA | COLOR DATA |
|---|---|
| ① | (141,192,200) |
| ② | (222,175,54) |
| ③ | (72,142,201) |
| . | . |
| . | . |
| . | . |

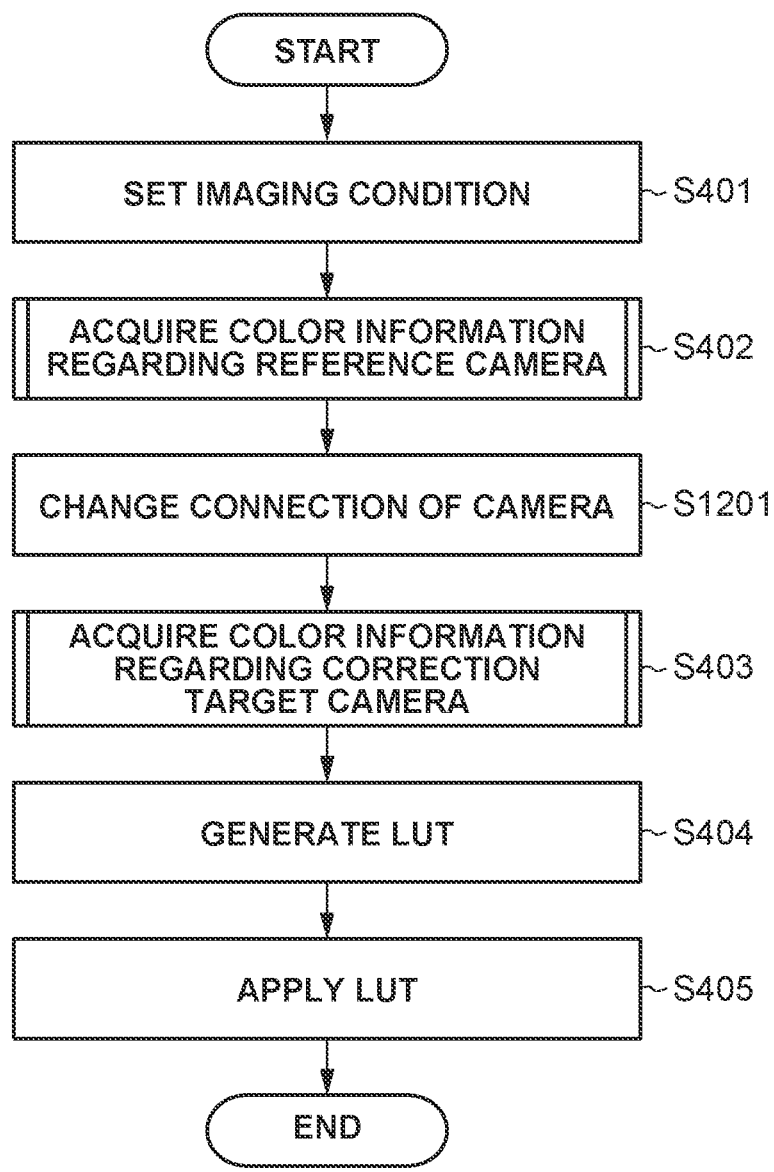

INFORMATION PROCESSING APPARATUS, METHOD, MEDIUM, AND SYSTEM FOR COLOR CORRECTION

BACKGROUND

Field

The present disclosure generally relates to a technique for generating information for color correction from captured images and, more particularly, to an information processing apparatus, method, medium, and system for color correction.

Description of the Related Art

There is a system that captures images using a plurality of imaging apparatuses (hereinafter, "cameras"), mixes or switches the plurality of images obtained by the plurality of cameras, and transmits the resulting images.

If the models, the manufacturers, or the grades of the plurality of cameras used at this time are different from each other, and there is a great difference in image creation between the cameras, and for example, when the cameras are switched, the color of even the same object may look different. Thus, a photographer or a video engineer (VE) needs to perform the work of adjusting the cameras in advance so that the colors of images of the plurality of cameras are the same as each other, which is a great burden. In response to this, the publication of Japanese Patent Application Laid-Open No. 2020-9162 discusses a technique for capturing images of the same object using cameras and correcting the difference in color between the captured images. This technique can reduce the burden of the work of adjusting cameras.

The difference in color between images of a plurality of cameras may also occur according to the recording modes of the cameras or the state of an object in the angles of view. For example, depending on the recording modes of the cameras or the state of the object in the angles of view, the compression ratio of a compression process performed on a captured image by each of the cameras may become high. In this case, the color of the object in the image may be different from the original color. In the technique of the publication of Japanese Patent Application Laid-Open No. 2020-9162, color correction data is created based on a captured image of a single frame. Thus, for example, if color correction data is created based on a color acquired from an image of which the compression ratio is high, a color that should not be corrected may be corrected based on the color correction data.

SUMMARY

According to an aspect of the present disclosure, an information processing apparatus includes a parameter acquisition unit configured to acquire imaging parameters of a first imaging apparatus and a second imaging apparatus, a number-of-images determining unit configured to, based on the imaging parameters, determine a number of first images to be captured by the first imaging apparatus and a number of second images to be captured by the second imaging apparatus, a color information acquisition unit configured to acquire first color information included in the first images and second color information included in the second images, and a generation unit configured to, based on the first color information and the second color information, generate color correction information for correcting a difference in color between the first and second images.

Further features of the present disclosure will become apparent from the following description of exemplary embodiments with reference to the attached drawings.

BRIEF DESCRIPTION OF THE DRAWINGS

FIG. 5 is a flowchart illustrating a flow of a color information acquisition process according to the first exemplary embodiment.

FIGS. 6A and 6B are diagrams illustrating correspondence relationships between imaging conditions and the number of images to be captured.

FIGS. 8A to 8C are diagrams illustrating contents of pieces of color information.

FIG. 14 is a flowchart illustrating a flow of information processing according to another exemplary embodiment.

DESCRIPTION OF THE EMBODIMENTS

With reference to the drawings, exemplary embodiments of the present disclosure will be described below. The following exemplary embodiments do not limit the present disclosure, and not all the combinations of the features described in the present exemplary embodiments are essential for a method for solving the issues in the present disclosure. The configurations of the exemplary embodiments can be appropriately modified or changed depending on the specifications of an apparatus to which the present disclosure is applied, or various conditions (the use conditions and the use environment). A configuration may be obtained by appropriately combining parts of the following exemplary embodiments. In the following exemplary embodiments, similar components are described by designating the same reference signs.

A first exemplary embodiment is described taking as an example a system where an information processing apparatus and a plurality of imaging apparatuses are connected to each other via a network. Based on an imaging parameter of each of the imaging apparatuses connected to the information processing apparatus according to the present exemplary embodiment via the network, the information processing apparatus determines the number of images to be captured and acquires color information from image data obtained by capturing as many images as the number of images to be captured. Then, based on the color information acquired from the image data on the as many images as the number of images to be captured, the information processing apparatus according to the present exemplary embodiment generates a lookup table (LUT) for color correction information for correcting the difference in color between images captured by the imaging apparatuses. In the following description, for ease of description, image data will be referred to simply as an "image", where appropriate.

For example, the system according to the present exemplary embodiment is applicable to a system that, in the broadcast of a television program or a live broadcast such as a sports broadcast, captures images using a plurality of cameras and mixes or switches the images captured by the plurality of cameras, thereby performing broadcasting. In a sports broadcast, such a broadcasting system can capture a bird's-eye view image of the entirety of a game venue using a certain camera, capture a player from various positions using other cameras, and generate images for relaying the state of a game. As a matter of course, the system according to the present exemplary embodiment is applied not only to such a broadcasting system.

Figure 1:
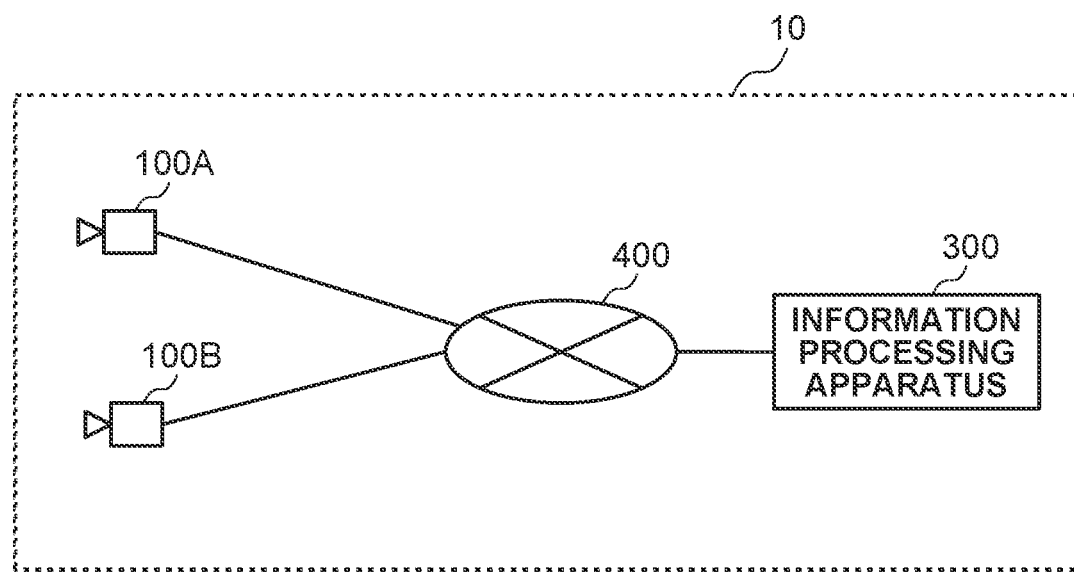
FIG. 1 is a diagram illustrating an example of a general configuration of a system according to a first exemplary embodiment.

FIG. 1 is a schematic diagram illustrating an example of the configuration of a system 10 including an information processing apparatus 300 according to the first exemplary embodiment. In the system 10 illustrated in FIG. 1, the information processing apparatus 300 according to the present exemplary embodiment and a plurality of imaging apparatuses such as a first imaging apparatus and a second imaging apparatus are connected to each other via a network 400. FIG. 1 illustrates a camera 100A as an example of the first imaging apparatus and a camera 100B as an example of the second imaging apparatus and illustrates only the two cameras 100A and 100B. The number of cameras, however, is not limited to two, and more cameras may be connected.

The network 400 connects the plurality of cameras 100A and 100B and the information processing apparatus 300 so that the plurality of cameras 100A and 100B and the information processing apparatus 300 can communicate with each other. The network 400 includes, for example, a plurality of routers, switches, and cables compliant with the Ethernet® communication standard. The communication standard, the scale, and the configuration of the network 400 do not matter so long as the network 400 is configured to enable communication between the cameras 100A and 100B and the information processing apparatus 300.

The information processing apparatus 300 has a controller function for controlling the plurality of cameras 100A and 100B and the function of generating a correction LUT for correcting the difference in color between images of the cameras 100A and 100B. The controller function is the function of enabling the setting of imaging parameters (hereinafter occasionally referred to also as "imaging conditions") for the cameras 100A and 100B, the acquisition of the imaging parameters, and control of imaging operations of the cameras 100A and 100B. The details of the imaging conditions of the cameras 100A and 100B and the acquisition of the imaging conditions will be described below. The LUT generation function is the function of acquiring color information (red, green, blue (RGB) values) from an image area of an object in images captured by each of the cameras 100A and 100B, generating degree-of-importance information at the same time, and generating an LUT for color correction information based on these pieces of information. The details of the acquisition of the color information and the generation of the LUT will be described below. The LUT generated by the information processing apparatus 300 is output to the cameras 100A and 100B via the network 400 and applied to the cameras 100A and 100B. This can acquire images obtained by correcting the difference in color between images of the cameras 100A and 100B. The information processing apparatus 300 can be composed of, for example, a terminal apparatus such as a personal computer (PC), a smartphone, or a tablet PC.

In the present exemplary embodiment, a color chart in which color patches of a plurality of different colors are arranged is taken as an example of the object. In the present exemplary embodiment, the degree-of-importance information is a weight coefficient for each piece of color information. The weight coefficient can be assigned not only as an integer but also as a decimal. Color information having a high degree of importance is weighted to strengthen the tendency to make the difference in color between the plurality of cameras 100A and 100B as small as possible when an LUT is generated.

Each of the cameras 100A and 100B includes a lens group and an image sensor included in an imaging optical system. The lens group includes an optical lens that forms an optical image of the object on an image sensor. The image sensor is an element that converts light into an analog image signal. Examples of the image sensor can include a complementary metal-oxide-semiconductor (CMOS) element. Each of the cameras 100A and 100B is a camera that captures one or more still images or movies.

In the present exemplary embodiment, a camera capable of capturing an image of a target color that can be matched between the cameras 100A and 100B is referred to as a "reference camera". Another camera that captures an image as a target to be corrected to the same color as the image of the reference camera is referred to as a "correction target camera". In the present exemplary embodiment, the following description is given on the assumption that, for example, the camera 100A in FIG. 1 is a reference camera, and the camera 100B is a correction target camera.

Figure 2:
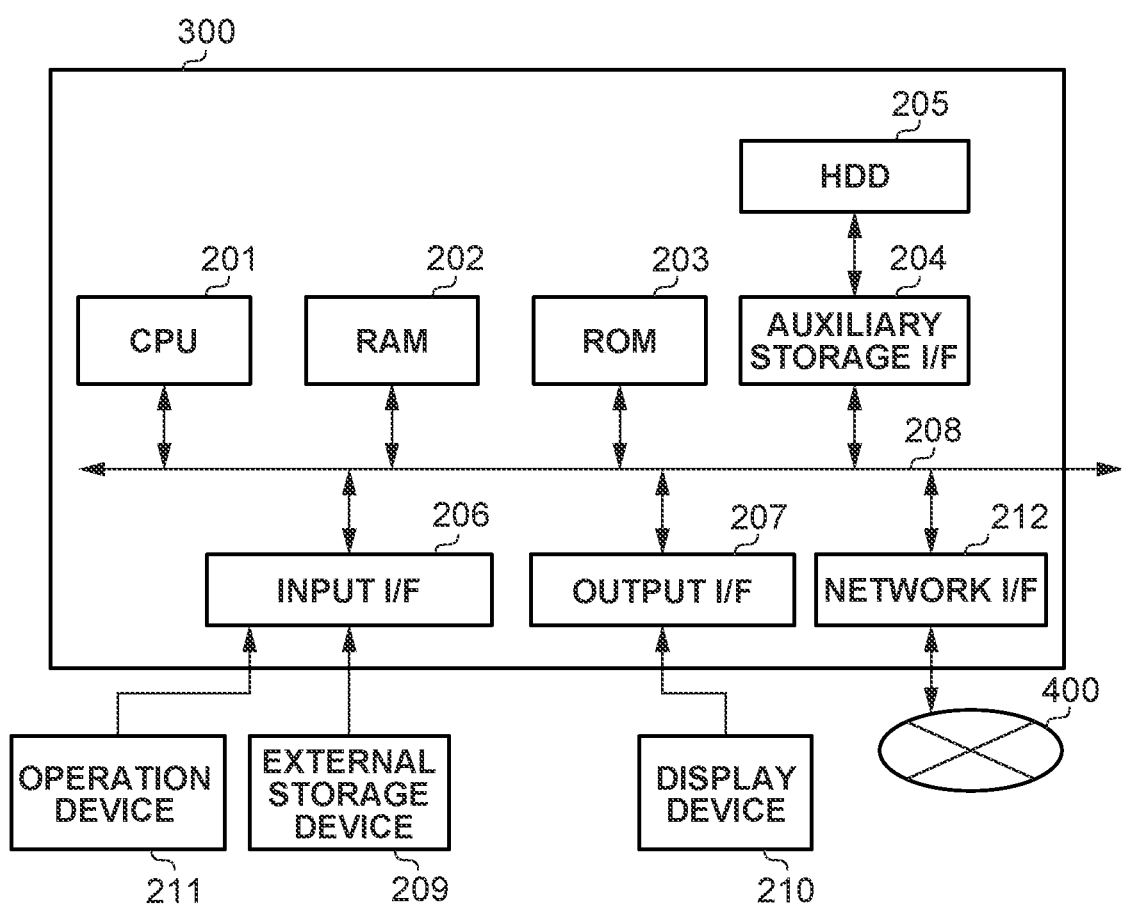
FIG. 2 is a diagram illustrating an example of a hardware configuration of an information processing apparatus.

FIG. 2 is a diagram illustrating an example of the hardware configuration of the information processing apparatus 300.

The information processing apparatus 300 includes a central processing unit (CPU) 201, a random-access memory (RAM) 202, a read-only memory (ROM) 203, an auxiliary storage interface (I/F) 204, a hard disk drive (HDD) 205, an input I/F 206, an output I/F 207, and a network I/F 212. The components of the information processing apparatus 300 are connected to each other by a system bus 208. The information processing apparatus 300 is connected to an external storage device 209 and an operation device 211 via the input I/F 206 and connected to a display device 210 via the output I/F 207. The information processing apparatus 300 is also connected to the network 400 illustrated in FIG. 1 via the network I/F 212.

The CPU 201 includes one or more processors, circuitry, or combinations thereof, and executes a control program stored in the ROM 203 using the RAM 202 as a work memory, thereby performing overall control of the components of the information processing apparatus 300 via the system bus 208. The CPU 201 also executes an information processing program stored in the ROM 203, thereby achieving information processing according to the present exemplary embodiment as described below. The HDD 205 is a storage device that stores various pieces of data including image data handled by the information processing apparatus 300. The CPU 201 writes data to the HDD 205 and reads data stored in the HDD 205 via the system bus 208. The storage device is not limited to the HDD 205, and may include a device using various storage devices, such as an optical disc drive, a flash memory, or the like.

The input I/F 206 is a serial bus I/F based on, for example, Universal Serial Bus (USB) or the Institute of Electrical and Electronics Engineers (IEEE) 1394. The information processing apparatus 300 acquires data and a command from an external apparatus via the input I/F 206. The external storage device 209 includes a storage medium such as a hard disk, a memory card, a CompactFlash (CF) card, a Secure Digital (SD) card, a USB memory, or the like. The information processing apparatus 300 acquires data from the external storage device 209 via the input I/F 206. The operation device 211 is an input device which includes a mouse, a keyboard, and a touch panel and to which an instruction from a user is input.

The information processing apparatus 300 acquires an instruction from the user input to the operation device 211 via the input I/F 206.

The output I/F 207 is a serial bus I/F based on USB or IEEE 1394, similarly to the input I/F 206. The output I/F 207 may be a video output terminal based on Digital Visual Interface (DVI) or High-Definition Multimedia Interface (HDMI®). The information processing apparatus 300 outputs data to an external apparatus via the output I/F 207. In the present exemplary embodiment, examples of the external apparatus connected to the information processing apparatus 300 via the output I/F 207 include the display device 210 (various image display devices such as a liquid crystal display). The information processing apparatus 300 outputs image data and various pieces of message information processed or generated by the CPU 201 to the display device 210 via the output I/F 207.

In the present exemplary embodiment, examples of data generated by the CPU 201 can include data indicating the result of generating an LUT.

The network I/F 212 includes a connector for connecting to a network such as Ethernet. The information processing apparatus 300 can acquire image data captured by each of the cameras 100A and 100B via the network 400 connected to the information processing apparatus 300 via the network I/F 212. The CPU 201 of the information processing apparatus 300 stores the image data and information regarding an imaging condition in the RAM 202 or the HDD 205 via the system bus 208.

The information processing apparatus 300 also includes components other than the components illustrated in FIG. 2, but these components are not illustrated or described here.

Under control of the CPU 201, the information processing apparatus 300 according to the present exemplary embodiment having the above configuration acquires image data on the correction target camera 100B and image data on the reference camera 100A that are input to the network I/F 212 via the network 400. Then, the information processing apparatus 300 acquires pieces of color information from the acquired pieces of image data, and based on the pieces of color information, generates an LUT for correcting the color of an image of the correction target camera 100B to match the color of an image of the reference camera 100A.

[Functional Configuration of Information Processing Apparatus]

Figure 3:
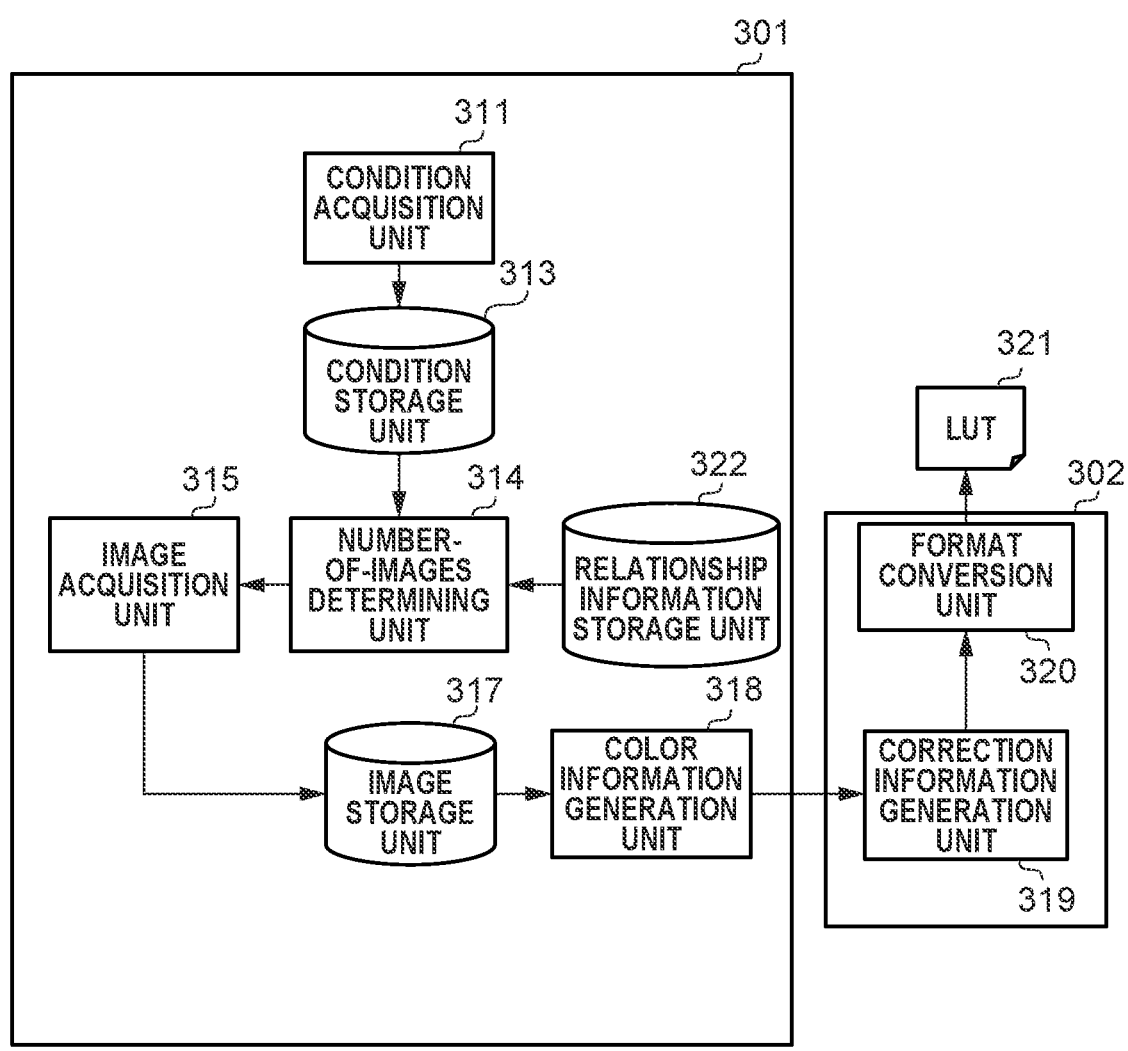
FIG. 3 is a diagram illustrating an example of a functional configuration of the information processing apparatus according to the first exemplary embodiment.

With reference to a functional block diagram in FIG. 3, the functional configuration of the information processing apparatus 300 according to the present exemplary embodiment is described. The configuration illustrated in FIG. 3 can be appropriately modified or changed. For example, a single function unit may be divided into a plurality of function units by function, or two or more function units may be integrated into a single function unit. The configuration in FIG. 3 may be composed of two or more apparatuses. In this case, the apparatuses may be connected to each other via a circuit or a wired or wireless network and cooperatively operate by communicating data with each other, thereby achieving processes performed by the information processing apparatus 300 in the following description.

In the following description, the function units illustrated in FIG. 3 perform processes. Actually, however, the functions of the function units are achieved by the CPU 201 executing an information processing program according to the present exemplary embodiment. The function units illustrated in FIG. 3 may be implemented as hardware components. As used herein, the term "unit" generally refers to software, firmware, hardware, or combinations thereof that is used to effectuate a purpose.

The information processing apparatus 300 mainly includes an input data processing unit 301 and an LUT generation unit 302. The input data processing unit 301 includes a condition acquisition unit 311, a condition storage unit 313, a number-of-images determining unit 314, an image acquisition unit 315, an image storage unit 317, a color information generation unit 318, and a relationship information storage unit 322. The LUT generation unit 302 includes a correction information generation unit 319 and a format conversion unit 320.

The condition acquisition unit 311 acquires an imaging condition from the reference camera 100A and also acquires an imaging condition from the correction target camera 100B. An imaging condition in the present exemplary embodiment includes at least any of an International Organization for Standardization (ISO) sensitivity, a shutter speed, a stop value, and an image recording parameter. Examples of the image recording parameter include an image recording mode and an image bit rate, i.e., an encoding method and a bit rate, and an encoding parameter (a quantization parameter). In the present exemplary embodiment, the condition acquisition unit 311 acquires information regarding an imaging condition set for each of the reference camera 100A and the correction target camera 100B, but for example, may acquire information regarding an imaging condition input by the user.

The condition storage unit 313 stores the imaging condition of each of the cameras 100A and 100B acquired by the condition acquisition unit 311.

The imaging condition stored in the condition storage unit 313 is referenced by the number-of-images determining unit 314.

The relationship information storage unit 322 stores correspondence relationship information describing the relationships between the number of images to be captured that indicates how many images can be captured by each of the cameras 100A and 100B to obtain color information, and a plurality of different imaging conditions. The details of the correspondence relationship information stored in the relationship information storage unit 322 and describing the relationships between the number of images to be captured to obtain color information, and the imaging conditions will be described below.

Based on the imaging condition stored in the condition storage unit 313, the number-of-images determining unit 314 references the correspondence relationship information stored in the relationship information storage unit 322 and determines the number of images to be captured that indicates how many images can be captured by each of the cameras 100A and 100B to obtain color information. That is, based on the imaging condition of each of the reference camera 100A and the correction target camera 100B, the number-of-images determining unit 314 references the correspondence relationship information and determines the number of first images to be captured by the reference camera 100A and the number of second images to be captured by the correction target camera 100B. The details of this number-of-images-to-be-captured determination process performed by the number-of-images determining unit 314 will be described below. Information regarding the number of images to be captured that is determined by the number-of-images determining unit 314 is sent to the image acquisition unit 315.

The image acquisition unit 315 sends a command to capture images to each of the cameras 100A and 100B via the network 400 and acquires images captured by each of the cameras 100A and 100B according to the command. That is, the image acquisition unit 315 causes each of the reference camera 100A and the correction target camera 100B to capture as many images as the number of images to be captured that is determined by the number-of-images determining unit 314, and acquires the as many captured images as the number of images to be captured.

The image storage unit 317 stores as many images as the number of images to be captured that are acquired from each of the cameras 100A and 100B by the image acquisition unit 315.

From the images acquired from each of the reference camera 100A and the correction target camera 100B by the image acquisition unit 315 and stored in the image storage unit 317, the color information generation unit 318 acquires color information for use in generating an LUT. In the present exemplary embodiment, first color information is acquired from an image area of the object in the first images captured by the reference camera 100A, and second color information is acquired from the image area of the object in common with the first images in the second images captured by the correction target camera 100B. Then, the color information generation unit 318 outputs the acquired first color information and second color information as a set to the correction information generation unit 319 of the LUT generation unit 302. This color information acquisition process is performed by the color information generation unit 318 based on, for example, an instruction from the user. The details of the color information acquisition process performed by the color information generation unit 318 will be described below.

Based on the set of the pieces of color information generated by the color information generation unit 318, the correction information generation unit 319 of the LUT generation unit 302 creates an LUT for correcting the color of an image acquired by the correction target camera 100B. That is, based on the set of the first color information and the second color information acquired by the color information generation unit 318, the correction information generation unit 319 creates an LUT for color correction information for correcting the difference in color between the first images captured by the reference camera 100A and the second images captured by the correction target camera 100B. As the LUT creation method, a method known generally may be used.

The format conversion unit 320 converts the LUT generated by the correction information generation unit 319 into a format that can be read by the correction target camera 100B (e.g., a cube file), and outputs the converted LUT as LUT data 321. The LUT data 321 is applied to the correction target camera 100B, whereby the color of an image of the correction target camera 100B matches the color of an image of the reference camera 100A.

Figure 4:
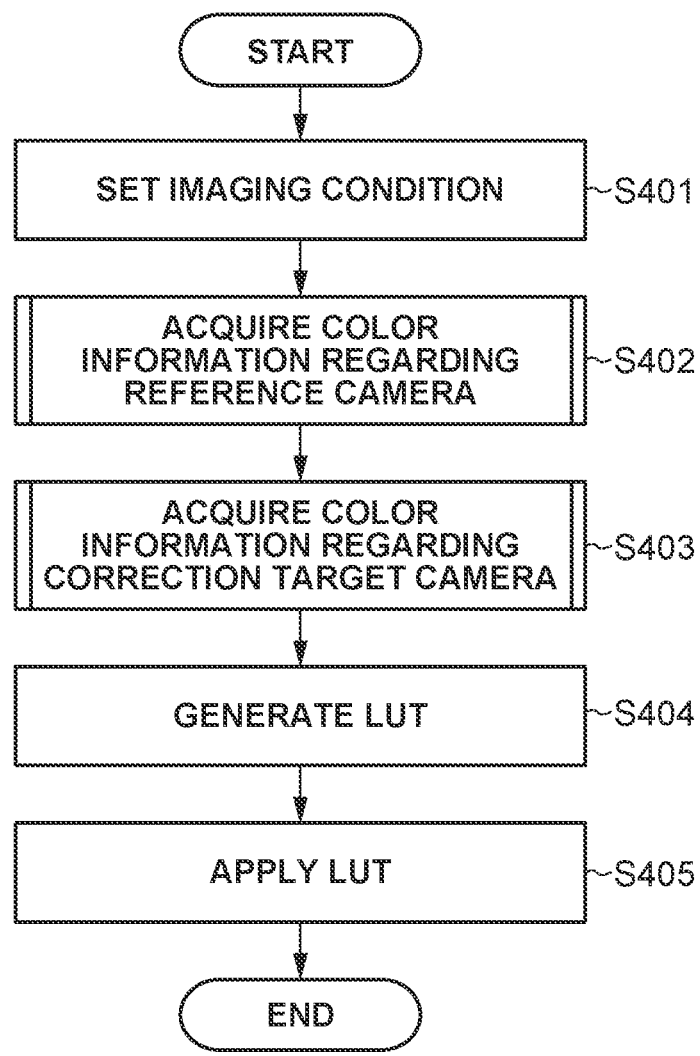
FIG. 4 is a flowchart illustrating a flow of information processing according to the first exemplary embodiment.

Next, with reference to a flowchart in FIG. 4, a description is given of the overall flow of information processing performed by the information processing apparatus 300 according to the present exemplary embodiment.

First, in step S401, the information processing apparatus 300 sets an imaging condition for each of the reference camera 100A and the correction target camera 100B using the above control function. Examples of the setting of the imaging condition for each of the cameras 100A and 100B include the setting of the image recording parameters such as the image recording mode and the image bit rate, and the setting of the ISO sensitivity, the shutter speed, and the stop value. Examples of the setting of the recording mode also include the setting of color gamut and gamma when an image is captured. The setting of the imaging condition for each of the reference camera 100A and the correction target camera 100B may be any of the setting based on an instruction from the user through the information processing apparatus 300, the setting directly made on each of the cameras 100A and 100B by the user, and the setting automatically made by each of the cameras 100A and 100B.

Next, in step S402, the input data processing unit 301 of the information processing apparatus 300 acquires the imaging condition set for each of the reference camera 100A and the correction target camera 100B in step S401, and based on the imaging condition, determines the number of images to be captured to obtain color information. Further, the input data processing unit 301 causes the reference camera 100A to acquire as many captured images as the number of images to be captured that is determined based on the imaging condition. Then, the input data processing unit 301 generates color information using the as many images as the number of images to be captured that are acquired by the reference camera 100A. The details of the process of step S402 will be described below.

In step S403, the input data processing unit 301 also causes the correction target camera 100B to acquire as many captured images as the number of images to be captured that is determined based on the imaging condition. Then, the input data processing unit 301 generates color information using the as many images as the number of images to be captured that are acquired by the correction target camera 100B. The process of step S403 is similar to that of step S402, except that the camera that captures images changes from the reference camera 100A to the correction target camera 100B. The details of the process of step S403 will be described below.

Next, in step S404, the correction information generation unit 319 of the LUT generation unit 302 acquires a set of the pieces of color information generated in steps S402 and S403 and performs a color correction information generation process using an optimization technique. In the present exemplary embodiment, the correction information generation unit 319 generates an LUT for color correction information for enabling the correction target camera 100B to reproduce the color of an image of the reference camera 100A. As the optimization technique, a DLS (damped least-squares) method, which is a known method, or a method discussed in the publication of Japanese Patent Application Laid-Open No. 2020-9162 can be used.

The DLS method is a method for obtaining a processing parameter so that the difference between a data stream obtained by processing a certain input data stream using a certain processing parameter and a target data stream corresponding to the data stream comes close to a target value stream. Examples of the processing parameter include a matrix. Examples of the target value stream include ΔE calculated from L*a*b* obtained based on red, green, and blue (RGB).

Next, in step S405, the format conversion unit 320 converts the LUT generated in step S404 into a format applicable to the correction target camera 100B, thereby generating the LUT data 321. The LUT data 321 is applied to the correction target camera 100B, whereby the color of an image of the correction target camera 100B approximately matches the color of an image of the reference camera 100A.

In the above description, the LUT is generated based on pieces of color information obtained from images captured by a single exposure. The present exemplary embodiment, however, is not limited to this, and the LUT may be generated using pieces of color information obtained from images captured by a plurality of exposures. In this case, the processes of steps S401 to S403 are repeatedly performed as many times as the number of imaging conditions with respect to each of the plurality of exposures.

[Details of Color Information Acquisition Process]

Next, with reference to a flowchart in FIG. 5, a description is given of the flow of the processing from the determination of the number of images to be captured based on the imaging condition to the acquisition of color information in steps S402 and S403 in FIG. 4.

In steps S402 and S403, similar processing is performed no matter which of the reference camera 100A and the correction target camera 100B is the camera that captures images. Thus, the reference camera 100A and the correction target camera 100B are referred to simply as a "camera" without identifying the reference camera 100A and the correction target camera 100B.

In step S501, the condition acquisition unit 311 of the input data processing unit 301 acquires the imaging condition of the camera set in step S401. Then, information regarding the imaging condition acquired by the condition acquisition unit 311 is stored in the condition storage unit 313.

Next, in step S502, based on the imaging condition stored in the condition storage unit 313 and the correspondence relationship information stored in the relationship information storage unit 322, the number-of-images determining unit 314 determines the number of images to be captured Fn.

FIG. 6A is a diagram illustrating an example of the correspondence relationship information stored in the relationship information storage unit 322. The correspondence relationship information exemplified in FIG. 6A is information indicating the relationship between the image recording parameters and the number of images to be captured Fn. That is, the correspondence relationship information illustrated in FIG. 6A is information indicating the correspondence relationship between information regarding the recording mode (the encoding method) and the bit rate as the image recording parameters as an example of the imaging condition of the camera, and the number of images to be captured Fn. Based on the imaging condition acquired in step S501, the number-of-images determining unit 314 references the correspondence relationship information in FIG. 6A, thereby determining the number of images to be captured Fn. The number of images to be captured Fn is determined based on the encoding method and the bit rate as the imaging condition because the lower the bit rate is, the higher the compression ratio is. As a result, the compressed image is likely to be influenced by block noise and have an error in color with respect to the original image. In the correspondence relationship information exemplified in FIG. 6A, the lower the bit rate is, the greater the number of images to be captured Fn to be determined is. If the number of images to be captured Fn is determined using the correspondence relationship information in FIG. 6A, the lower the bit rate is, the greater the number of images to be captured Fn is. This can reduce the influence of an error in color.

The correspondence relationship information stored in the relationship information storage unit 322 may also include information indicating the relationship between the image recording parameter and the number of images to be captured Fn as illustrated in FIG. 6B, for example. The correspondence relationship information in FIG. 6B is information indicating the correspondence relationship between the quantization parameter (the encoding parameter) based on H.264 as the image recording parameter as an example of the imaging condition of the camera, and the number of images to be captured Fn. Based on the imaging condition acquired in step S501, the number-of-images determining unit 314 references the correspondence relationship information illustrated in FIG. 6B, thereby determining the number of images to be captured Fn. That is, in the case of the quantization parameter, the greater the value of the quantization parameter is, the more likely the quantized image is to be influenced by noise and have an error in color with respect to the original image. Thus, in the correspondence relationship information in FIG. 6B, the greater the value of the quantization parameter is, the greater the number of images to be captured Fn to be determined is. If the number of images to be captured Fn is determined using the correspondence relationship information in FIG. 6B, the greater the value of the quantization parameter is, the greater the number of images to be captured Fn is. This can reduce the influence of an error.

Alternatively, the number-of-images determining unit 314 may determine the number of images to be captured Fn based on not only the image recording parameters exemplified in FIG. 6A or 6B, but also the imaging condition such as the ISO sensitivity, the shutter speed, or the stop value. That is, an error in the color of the captured image with respect to the original color of the object may be influenced by noise generated due to the ISO sensitivity, the shutter speed, or the stop value. For example, if the ISO sensitivity is increased, noise in the captured image tends to be large. If the shutter speed is fast, noise tends to be small. If the stop value is great, noise tends to be small. Thus, the number-of-images determining unit 314 determines the number of images to be captured Fn so that the higher the ISO sensitivity is, the greater the number of images to be captured Fn is, and that the slower the shutter speed is, the greater the number of images to be captured Fn is, and that the smaller the stop value is, the greater the number of images to be captured Fn is. This can reduce the influence of noise due to the ISO sensitivity, the shutter speed, and the stop value.

The description returns to FIG. 5. In step S503, the image acquisition unit 315 causes the camera to capture a single image of the object and acquires the image. Then, the image storage unit 317 stores the image acquired by the image acquisition unit 315.

Next, in step S504, based on specifying by the user, the color information generation unit 318 acquires color information from the image stored in the image storage unit 317.

Figure 7A:
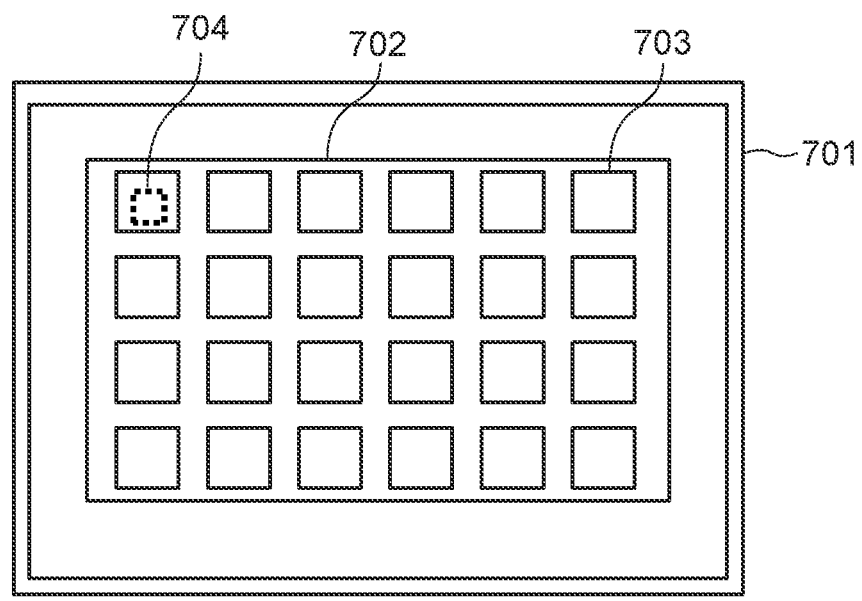
FIGS. 7A and 7B are diagrams used to describe an image area from which color information is acquired.
Figure 7B:
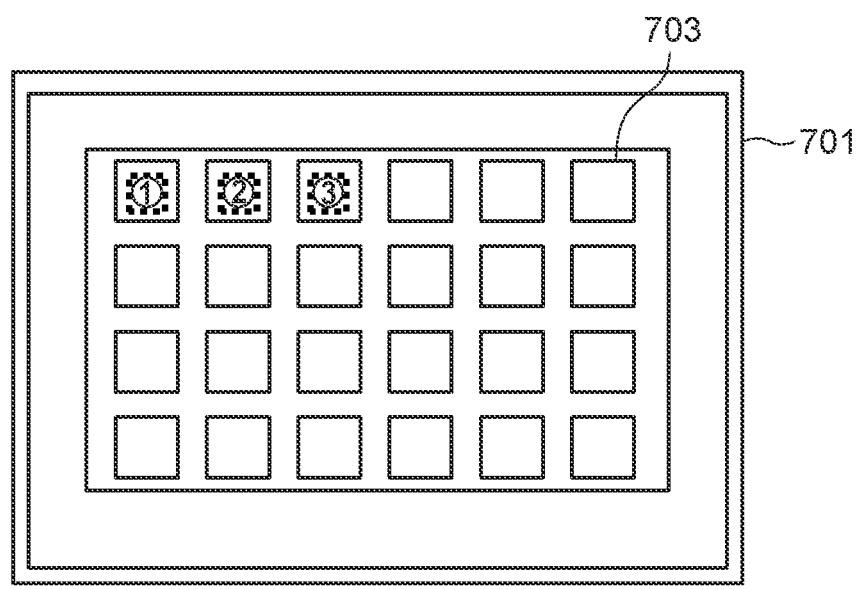

With reference to FIGS. 7A and 7B, a description is given of the details of the color information acquisition process performed by the color information generation unit 318 based on the specifying by the user in step S504.

FIG. 7A is a diagram illustrating an example of a graphical user interface (GUI) window 701 displayed on the screen of the display device 210 in FIG. 2. In the GUI window 701, the captured image is displayed.

In the present exemplary embodiment, since the color chart is used as the object, a color chart image 702 obtained by capturing the color chart is displayed in the GUI window 701. In the color chart, a plurality of color patches composed of different colors is disposed. Thus, color patch images 703 of the respective colors appear in the color chart image 702 in the GUI window 701. The user can select a desired color patch image 703, i.e., a desired color, from the color chart image 702 by operating the mouse or the touch panel of the operation device 211. In the example of FIG. 7A, an area 704 indicated by a dotted line is a position selected and specified by the user in the color chart image 702. That is, in the present exemplary embodiment, the area 704 specified by the user is the position of an image area from which the color information generation unit 318 acquires the color information.

The color information generation unit 318 acquires as the color information a value obtained by acquiring the average pixel value of pixels in the area 704 specified by the user with respect to each of as many images as the number of images to be captured Fn and averaging the acquired average pixel values by the number of images to be captured Fn. If a plurality of areas is specified from the color chart image 702 in the GUI window 701, numbers are assigned to the respective areas selected by the user as illustrated in FIG. 7B, whereby it is possible to indicate the correspondence relationships between a plurality of pieces of color information between the cameras 100A and 100B.

The description returns to FIG. 5. In step S505, the image acquisition unit 315 determines whether the number of the images acquired from the camera reaches the number of images to be captured Fn determined in step S502, i.e., whether the number of the images captured by the camera≥Fn. If the number of the images acquired from the camera reaches the number of images to be captured Fn (Yes in step S505), the processing proceeds to step S506. If, on the other hand, the number of the images acquired from the camera does not reach the number of images to be captured Fn (No in step S505), the image acquisition unit 315 increments the number of the images acquired from the camera, and then, the processing returns to step S503. Consequently, the image acquisition unit 315 causes the camera to capture one more image of the object and acquires the captured image. If the color information is acquired from the second or subsequent captured image, the specifying of the acquisition position of the color information in step S504 may not be performed, and the color information may be acquired using information regarding the acquisition position specified in the previous image.

In step S506, the color information generation unit 318 generates as color information a value obtained by obtaining the average pixel value from the area in each of the as many images as the number of images to be captured Fn in step S504 and further averaging the obtained average pixel values by the number of images to be captured Fn. For example, if the number of images to be captured Fn is four, the color information generation unit 318 generates as the color information a value calculated by obtaining the average pixel value from the image area specified by the user in each of four images in step S504 and further averaging the obtained average pixel values by the four images.

Then, the color information generation unit 318 outputs the generated color information to the correction information generation unit 319 of the LUT generation unit 302.

The color information obtained from the image area specified in the as many images as the number of images to be captured Fn that are obtained as described above is data in which the image area and the pixel value are associated with each other with respect to each of the cameras 100A and 100B. In the as many images as the number of images to be captured Fn, pieces of color information regarding an image area of a color patch at the same position in the color chart can normally have the same value, and can also have the same value between the plurality of cameras 100A and 100B. These colors, however, may differ depending on the imaging conditions of the cameras 100A and 100B. FIGS. 8A to 8C are diagrams illustrating examples of pieces of color information regarding the same image areas of the same color patches with respect to each camera in a case where the image areas of the color patches in the color chart are numbered in order from the upper left to the right, for example. Specifically, FIGS. 8A to 8C illustrate pieces of color information obtained from the image areas of color patches at the same positions in the same color chart in a case where the color chart is captured by respective cameras A to C as a plurality of cameras. The pieces of color information regarding the cameras A to C, however, have different values in the image areas of the same color patches assigned the same numbers due to the differences between the imaging conditions.

The correction information generation unit 319 of the LUT generation unit 302 generates an LUT for color correction information that enables the correction of the color of an image of the correction target camera 100B so that the color of the image area of a color patch at the same position in the color chart image captured by the correction target camera 100B matches the color of the image area of the same color patch captured by the reference camera 100A.

As described above, based on the information processing apparatus according to the present exemplary embodiment, regardless of imaging conditions such as the recording modes of cameras, an LUT that enables the correction of the difference in color between images of the cameras is generated. Consequently, the cameras can generate images in which the same object has the same color.

Next, a second exemplary embodiment is described. Processing according to the second exemplary embodiment is different from the processing described in the first exemplary embodiment in the color information acquisition process performed by the reference camera 100A in step S402 and the color information acquisition process performed by the correction target camera 100B in step S403.

The information processing apparatus 300 according to the second exemplary embodiment determines noise in images captured by the reference camera 100A and the correction target camera 100B. In the second exemplary embodiment, it is determined whether the first color information acquired from the first images captured by the reference camera 100A and the second color information acquired from the second images captured by the correction target camera 100B include color noise exceeding a predetermined color noise threshold. Then, based on the result of determining color noise, the information processing apparatus 300 determines whether to add a predetermined number of images to the number of images to be captured Fn. That is, if the first color information and the second color information include color noise exceeding the color noise threshold, the information processing apparatus 300 according to the second exemplary embodiment adds the predetermined number of images to the number of images to be captured Fn.

The information processing apparatus 300 according to the second exemplary embodiment also calculates the amount of noise included in as many images as the number of images to be captured Fn that is determined similarly to the first exemplary embodiment. In the present exemplary embodiment, the information processing apparatus 300 acquires the amount of block noise as the amount of noise. Then, based on the amount of block noise obtained by this amount-of-noise acquisition process, the information processing apparatus 300 makes an adoption determination regarding whether to adopt the as many captured images as the number of images to be captured Fn as images from which the first color information and the second color information are to be acquired, i.e., whether to adopt the as many captured images as the number of images to be captured Fn to generate an LUT. If the amount of block noise obtained by the amount-of-block-noise acquisition process is greater than or equal to a predetermined block noise threshold, the information processing apparatus 300 does not adopt the as many captured images as the number of images to be captured Fn as the images from which the first color information and the second color information are to be acquired. Then, the information processing apparatus 300 adds the predetermined number of images again to the number of images to be captured Fn. Then, using captured images acquired by adding the predetermined number of images again, the information processing apparatus 300 attempts to acquire color information. Further, the information processing apparatus 300 according to the present exemplary embodiment can set a predetermined upper limit number of images for the number of images to be captured Fn, and performs the process of confirming the number of images to be captured so that the number of images to be captured Fn does not exceed the upper limit number of images.

The reason for determining the amount of block noise is to take measures against a case where, when the object (the color chart) is captured, block noise is generated more than normally assumed in the compressed image by a moving object suddenly cutting into the angle of view or the object or the camera itself shaking. As described above, in the second exemplary embodiment, based on the result of determining the amount of block noise, it is determined whether to acquire color information from captured images, i.e., whether an LUT can be optimized. If it is difficult to optimize the LUT, an attempt is made to acquire color information using captured images obtained by further adding the predetermined number of images to the number of images to be captured Fn. Then, if the amount of block noise in images obtained by additionally capturing images is less than the threshold, the information processing apparatus 300 acquires color information from the images and generates an LUT. In the present exemplary embodiment, the predetermined upper limit number of images is set for the additional capturing of images. If the amount of block noise in additionally captured images within the upper limit number of images is less than the threshold, the information processing apparatus 300 acquires color information from the captured images and generates an LUT. If color information as assumed cannot be obtained from the additionally captured images within the upper limit number of images, for example, the information processing apparatus 300 displays a warning message and ends the processing.

Figure 9:
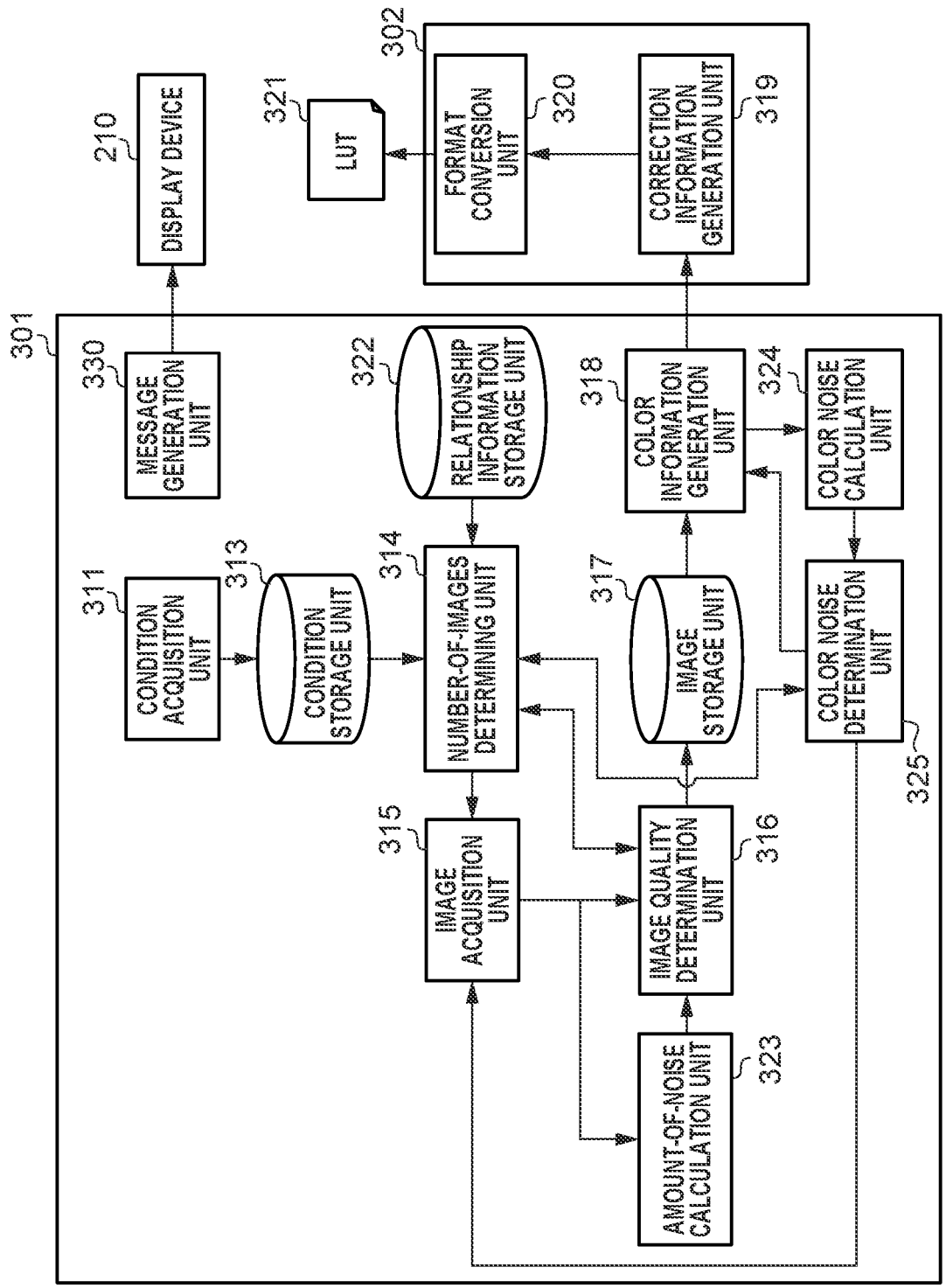
FIG. 9 is a diagram illustrating an example of a functional configuration of an information processing apparatus according to a second exemplary embodiment.
Figure 10:
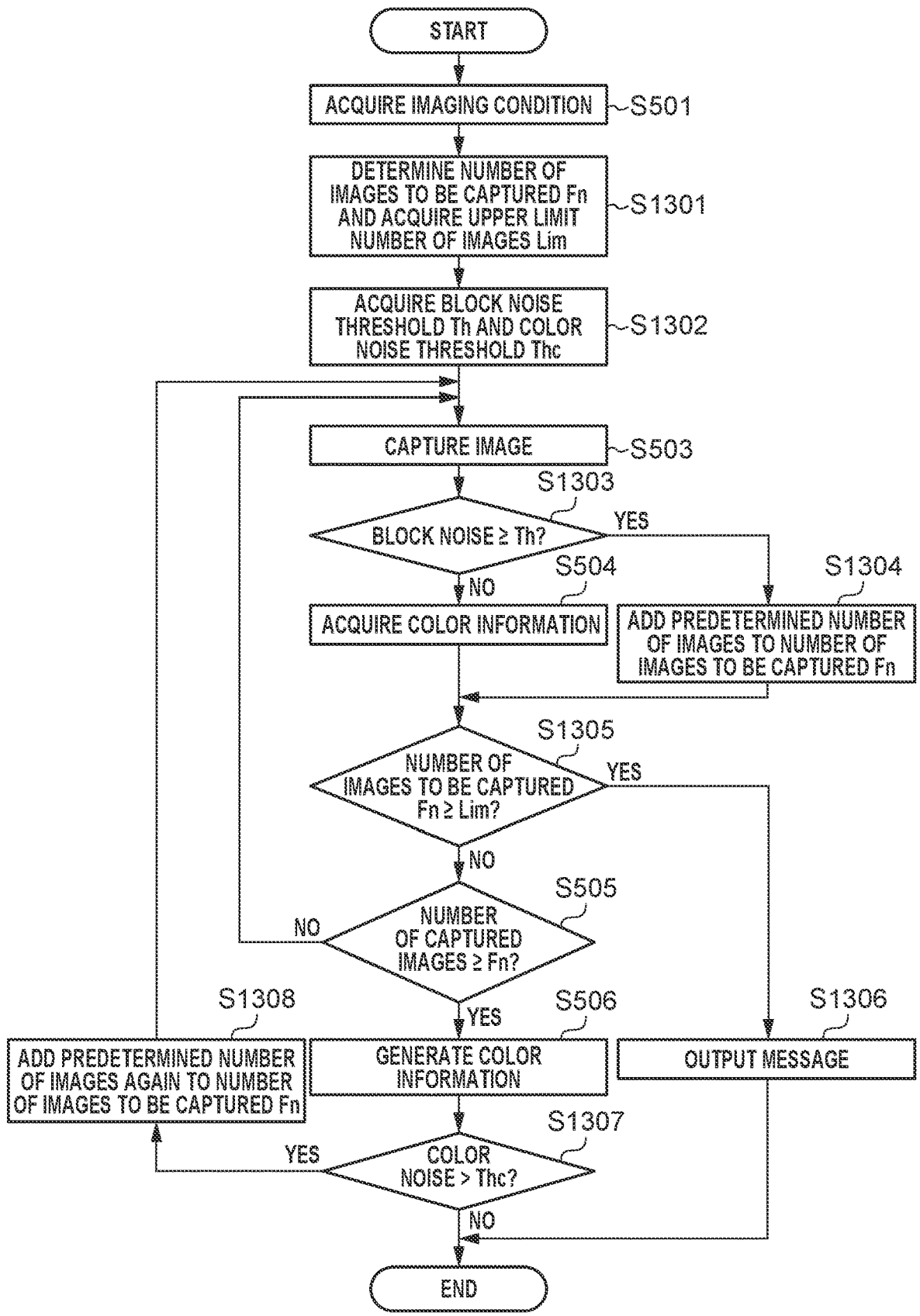
FIG. 10 is a flowchart illustrating a flow of a color information acquisition process according to the second exemplary embodiment.

FIG. 9 is a diagram illustrating an example of the functional configuration of the input data processing unit 301 and the LUT generation unit 302 of the information processing apparatus 300 according to the second exemplary embodiment. In the second exemplary embodiment, the configuration illustrated in FIG. 9 can be appropriately modified or changed. For example, a single function unit may be divided into a plurality of function units by function, or two or more function units may be integrated into a single function unit. The configuration in FIG. 9 may be composed of two or more apparatuses. In this case, the apparatuses may be connected to each other via a circuit or a wired or wireless network and cooperatively operate by communicating data with each other. Further, FIG. 10 is a flowchart illustrating the flow of the color information acquisition process in steps S402 and S403 in FIG. 4 performed by the input data processing unit 301 according to the second exemplary embodiment. Components and processes similar to those in the first exemplary embodiment are not described, and only components and processes different from those of the first exemplary embodiment are described here.

First, in the functional configuration illustrated in FIG. 9, function units different from those of the first exemplary embodiment are described.

An amount-of-noise calculation unit 323 calculates the amount of noise included in each of the images acquired by the image acquisition unit 315. In the present exemplary embodiment, the amount of noise calculated by the amount-of-noise calculation unit 323 is the amount of block noise. The details of this amount-of-block-noise calculation process will be described below.

Based on the result of the amount-of-noise calculation unit 323 calculating the amount of block noise, an image quality determination unit 316 determines whether the image acquired by the image acquisition unit 315 has such an image quality that the image can be used to acquire color information. In the second exemplary embodiment, the relationship information storage unit 322 also stores a block noise threshold Th, and the block noise threshold Th read from the relationship information storage unit 322 is input to the image quality determination unit 316 via the number-of-images determining unit 314. Then, the image quality determination unit 316 compares the amount of block noise calculated by the amount-of-noise calculation unit 323 and the block noise threshold Th read from the relationship information storage unit 322. If the calculated amount of block noise is greater than or equal to the block noise threshold Th, the image quality determination unit 316 determines that the image acquired by the image acquisition unit 315 does not have such an image quality that the image can be adopted to acquire color information. The details of this process will be described below.

If the image quality determination unit 316 obtains the determination result that the image does not have such an image quality that the image can be adopted to acquire color information, the image stored in the image storage unit 317 is not used when the color information generation unit 318 generates color information. In this case, the number-of-images determining unit 314 adds a predetermined number of images to the number of images to be captured. Consequently, the image acquisition unit 315 causes the camera to acquire as many images as the added number of images. At this time, the number-of-images determining unit 314 also performs a number-of-images confirmation process for preventing the number of images to be captured from exceeding a predetermined upper limit number of images due to the addition of the number of images. The details of this process will be described below.

A color noise calculation unit 324 performs a color noise acquisition process for calculating the amount of color noise included in the color information generated by the color information generation unit 318.

A color noise determination unit 325 determines whether the amount of color noise calculated by the color noise calculation unit 324 exceeds a color noise threshold Thc. In the second exemplary embodiment, the relationship information storage unit 322 also stores the color noise threshold Thc, and the color noise threshold Thc read from the relationship information storage unit 322 is input to the color noise determination unit 325 via the number-of-images determining unit 314. Then, the color noise determination unit 325 compares the amount of color noise calculated by the color noise calculation unit 324 and the color noise threshold Thc read from the relationship information storage unit 322. That is, the color noise determination unit 325 determines whether the calculated amount of color noise exceeds the color noise threshold Thc. The details of this process will be described below.

If the color noise determination unit 325 obtains the determination result that the calculated amount of color noise exceeds the color noise threshold Thc, the number-of-images determining unit 314 adds the predetermined number of images again to the number of images to be captured. Consequently, the image acquisition unit 315 causes the camera to acquire as many images as the number of images added again. The details of this process will be described below.

In the number-of-images confirmation process performed by the number-of-images determining unit 314, if it is determined that the number of images to be captured exceeds the upper limit number of images, the message generation unit 330 outputs message information for warning the user about this state to the display device 210, for example. The message information may be text information or an icon, or may be in any other format. The same applies to other message information described below.

With reference to a flowchart in FIG. 10, a description is given of the flow of information processing according to the second exemplary embodiment. In the second exemplary embodiment, after step S501, the processes of steps S1301 and S1302 are performed, and then, the processing proceeds to step S503. After the process of step S503, a determination process in step S1303 is performed, and based on the result of the determination, the process of either of steps S504 and S1304 is performed. After the process of step S504 or S1304, a determination process in step S1305 is performed, and based on the result of the determination, the process of either of steps S505 and S1306 is performed. Further, after the process of step S506, a determination process in step S1307 is performed, and based on the result of the determination, the processing of the flowchart ends, or the process of step S1308 is performed. Then, after the process of step S1308, the processing returns to step S503. After the process of step S1306, the processing of the flowchart ends.

After step S501, then in step S1301, based on the imaging condition obtained in step S501 and the correspondence relationship information stored in the relationship information storage unit 322, the number-of-images determining unit 314 determines the number of images to be captured Fn. Further, in step S1301, the number-of-images determining unit 314 acquires from the relationship information storage unit 322 an upper limit number of images Lim for a number-of-images-to-be-captured confirmation process performed when images are additionally captured. The upper limit number of images Lim is a value set to, when images need to be captured again due to the influence of noise, prevent the number of images to be captured again from increasing unlimitedly. In the present exemplary embodiment, the upper limit number of images Lim is set to 120, for example.

Next, in step S1302, the number-of-images determining unit 314 reads the block noise threshold Th and the color noise threshold Thc stored in the relationship information storage unit 322. Specifically, examples of the block noise threshold Th include the number of gradation levels found by detecting block noise. The relationship information storage unit 322 stores the block noise threshold Th obtained in advance. Examples of the color noise threshold Thc include a standard deviation from the average value of color information with respect to each image. For example, if the number of images to be captured Fn is set to eight, the color information generation unit 318 acquires the average value of pieces of color information regarding each image area in eight images. Thus, the relationship information storage unit 322 stores as the color noise threshold Thc a standard deviation obtained from pieces of color information obtained with respect to each image area in eight images acquired by capturing the color chart in advance. The number-of-images determining unit 314 sends information regarding the block noise threshold Th read from the relationship information storage unit 322 to the image quality determination unit 316 and sends information regarding the color noise threshold Thc to the color noise determination unit 325.

After step S503, then in step S1303, the amount-of-noise calculation unit 323 calculates the amount of block noise in the image acquired in step S503. For the calculation of the amount of block noise, for example, a method discussed in the publication of Japanese Patent Application Laid-Open No. 2001-218210 can be used. The method discussed in Japanese Patent Application Laid-Open No. 2001-218210 is known, and therefore is not described.

Further, in step S1303, the image quality determination unit 316 compares the amount of block noise calculated by the amount-of-noise calculation unit 323 and the block noise threshold Th and determines whether the amount of block noise is greater than or equal to the block noise threshold Th (block noise≥Th). If the amount of block noise is less than the block noise threshold Th (No in step S1303), the image quality determination unit 316 determines that the image acquired in step S503 can be adopted as an image for use in generating color information. That is, in this case, the image acquired in step S503 is used in a color information generation process performed by the color information generation unit 318. Then, the processing proceeds to step S504. If, on the other hand, the amount of block noise is greater than or equal to the block noise threshold Th (Yes in step S1303), the image quality determination unit 316 determines that the image acquired by the image acquisition unit 315 cannot be adopted as an image for use in generating color information. That is, in this case, the image acquired in step S503 is not used in the color information generation process performed by the color information generation unit 318. Then, the processing proceeds to step S1304.

In step S1304, the number-of-images determining unit 314 adds a predetermined number of images to the number of images to be captured Fn, and the image acquisition unit 315 acquires as many images as the added number of images. In the present exemplary embodiment, the number-of-images determining unit 314 adds 1 to the number of images to be captured Fn (adds a single image to the number of images to be captured Fn), and the image acquisition unit 315 causes the camera to capture an image corresponding to the added single image and acquires the image.

After step S504 or S1304, then in step S1305, the number-of-images determining unit 314 performs a number-of-images-to-be-captured confirmation process for determining whether the number of captured images Fn is greater than or equal to the upper limit number of images Lim (the number of images to be captured Fn≥Lim). For example, if it is determined in step S1301 that the number of images to be captured Fn is eight, and the number of images (the number of frames) in which the amount of block noise calculated in step S1303 is greater than or equal to the block noise threshold Th is 121, the number of images to be captured Fn is greater than or equal to the upper limit number of images Lim. In this case, the number-of-images determining unit 314 determines that the amount of noise is greater than assumed and it is less likely that an image that can be adopted to generate color information can be captured. In this case (Yes in step S1305), the processing proceeds to step S1306. If, on the other hand, the number-of-images determining unit 314 determines that the number of images to be captured Fn is not greater than or equal to the upper limit number of images Lim (No in step S1305), the processing proceeds to step S505. The upper limit number of images Lim is 120 in the present exemplary embodiment, but is not particularly limited to this value. The value may be changed according to the imaging condition.

If the number-of-images determining unit 314 determines that the number of images to be captured Fn is greater than or equal to the upper limit number of images Lim, then in step S1306, the message generation unit 330 generates message information indicating that the number of images to be captured that is greater than or equal to assumed is used to acquire color information in the current situation, and it is difficult to acquire color information. Then, the message information generated by the message generation unit 330 is sent to and displayed on the display device 210. This enables the user to recognize that it is difficult to acquire color information. After step S1306, the processing of the flowchart in FIG. 10 ends.

In step S1307, the color noise calculation unit 324 calculates the amount of color noise included in the color information generated by the color information generation unit 318. The color noise determination unit 325 determines whether the calculated amount of color noise is greater than the color noise threshold Thc. Then, if the color noise determination unit 325 determines that the calculated amount of color noise is greater than the color noise threshold Thc (Yes in step S1307), the processing proceeds to step S1308. If, on the other hand, the color noise determination unit 325 determines that the calculated amount of color noise is less than or equal to the color noise threshold Thc (color noise≤Thc) (No in step S1307), the color information generated in step S506 is output to the LUT generation unit 302. Then, the processing of the flowchart in FIG. 10 ends.

In step S1308, to improve color noise, the number-of-images determining unit 314 adds the predetermined number of images again to the number of images to be captured Fn. For example, if it is determined in step S1301 that the number of images to be captured Fn is eight, the number-of-images determining unit 314 adds four images as the addition of the predetermined number of images to the number of images to be captured Fn performed again. Then, the processing proceeds to step S503.

As described above, according to the second exemplary embodiment, regardless of imaging conditions of cameras or the state of an object, it is possible to correct the difference in color between images of the cameras. When color information is acquired, it is possible to acquire color information also corresponding to abrupt noise fluctuation when an image is captured. According to the second exemplary embodiment, it is possible to confirm whether generated color information is obtained as assumed. Thus, it is possible to generate an LUT for correcting the colors of images of the cameras with higher accuracy.

Next, a third exemplary embodiment is described. The third exemplary embodiment is different from the above exemplary embodiments in the color information acquisition method of the reference camera 100A in step S402 and the color information acquisition method of the correction target camera 100B in step S403. Specifically, based on an imaging condition, the information processing apparatus 300 according to the third exemplary embodiment performs a generation determination process for determining whether much noise is likely to be generated. Then, as the result of the generation determination process, if it is highly likely that much noise is generated, the information processing apparatus 300 displays a message for notifying the user of this state. Only if the processing is to be continued nonetheless, the information processing apparatus 300 generates an LUT for color correction. Components and processes similar to those in the above exemplary embodiments are not described, and only components and processes different from those of the above exemplary embodiments are described.

The functional configuration of the information processing apparatus 300 according to the third exemplary embodiment is approximately similar to that described above in FIG. 3, except that the input data processing unit 301 includes a message generation unit 330. Although the details will be described below, in the third exemplary embodiment, based on an acquired imaging condition, the input data processing unit 301 performs a generation determination process for determining whether it is highly likely that much noise is generated and it becomes difficult to acquire color information. Then, if the input data processing unit 301 determines that it is highly likely that it becomes difficult to acquire color information, the message generation unit 330 outputs message information for notifying the user of this state and further outputs message information for inquiring whether to change the setting of the imaging condition. The details of this process will be described below.

Figure 11:
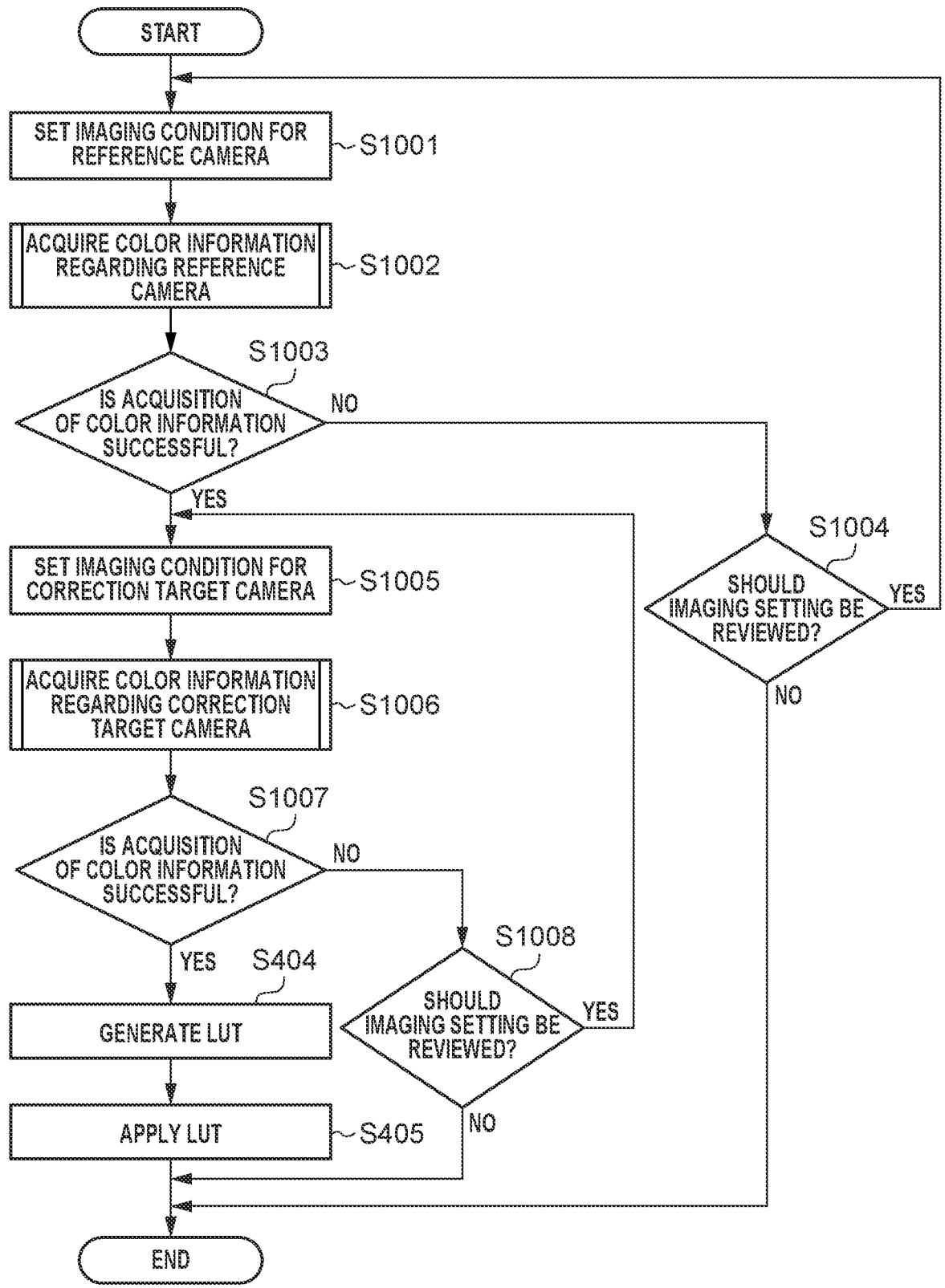
FIG. 11 is a flowchart illustrating a flow of information processing according to a third exemplary embodiment.

FIG. 11 is a flowchart illustrating the overall flow of processing performed by the information processing apparatus 300 according to the third exemplary embodiment. In the flowchart in FIG. 11, the processes of steps S404 and S405 are similar to those of steps S404 and S405 in the flowchart in FIG. 4, and therefore are not described.

First, in step S1001, the information processing apparatus 300 sets an imaging condition for the reference camera 100A. The specific content of the setting process for setting the imaging condition is similar to that of the process described above in step S401.

Next, in step S1002, the input data processing unit 301 acquires the imaging condition of the reference camera 100A, and based on the imaging condition, determines the number of images to be captured to obtain color information. Further, the input data processing unit 301 acquires as many images as the number of images to be captured and generates color information. At this time, however, based on the imaging condition, the input data processing unit 301 determines whether it is highly likely that much noise is generated and it becomes difficult to acquire color information. Then, the input data processing unit 301 generates and outputs message information according to the result of the determination. The details of the process of step S1002 will be described below with reference to a flowchart in FIG. 12.

Next, in step S1003, the input data processing unit 301 determines whether the acquisition of color information is successful in the process of step S1002. Then, if it is determined that the acquisition of color information is successful (Yes in step S1003), the processing proceeds to step S1005. If, on the other hand, it is determined that the acquisition of color information fails (No in step S1003), the processing proceeds to step S1004.

In step S1004, the input data processing unit 301 determines whether the imaging setting of the reference camera 100A can be reviewed. For example, the input data processing unit 301 generates message information for inquiring of the user about whether to review the setting, displays the message information on the display device 210, and makes the determination based on an input from the user. Then, if an instruction to review the setting is input by the user (Yes in step S1004), the processing returns to step S1001. If the setting is not to be reviewed (No in step S1004), the processing of the flowchart in FIG. 11 ends.

In step S1005, the information processing apparatus 300 sets an imaging condition for the correction target camera 100B. The specific content of the setting process for setting the imaging condition is similar to that of the process described above in step S401.

Next, in step S1006, the input data processing unit 301 acquires the imaging condition of the correction target camera 100B, and based on the imaging condition, determines the number of images to be captured to obtain color information. Further, the input data processing unit 301 acquires as many images as the number of images to be captured and generates color information. At this time, however, based on the imaging condition, the input data processing unit 301 determines whether it is highly likely that much noise is generated and it becomes difficult to acquire color information. Then, the input data processing unit 301 generates and outputs message information according to the result of the determination. The details of the process of step S1006 will be described below with reference to the flowchart in FIG. 12.

Next, in step S1007, the input data processing unit 301 determines whether the acquisition of color information is successful in the process of step S1006. Then, if it is determined that the acquisition of color information is successful (Yes in step S1007), the processing proceeds to step S404, which is performed by the LUT generation unit 302 of the information processing apparatus 300. If, on the other hand, it is determined that the acquisition of color information fails (No in step S1007), the processing proceeds to step S1008.

In step S1008, the input data processing unit 301 determines whether the imaging setting of the correction target camera 100B can be reviewed. Also in this step, similarly to step S1004, the input data processing unit 301 generates message information for inquiring of the user about whether to review the setting, displays the message information on the display device 210, and makes the determination based on an input from the user. Then, if an instruction to review the setting is input by the user (Yes in step S1008), the processing returns to step S1005. If the setting is not to be reviewed (No in step S1008), the processing of the flowchart in FIG. 11 ends.

Figure 12:
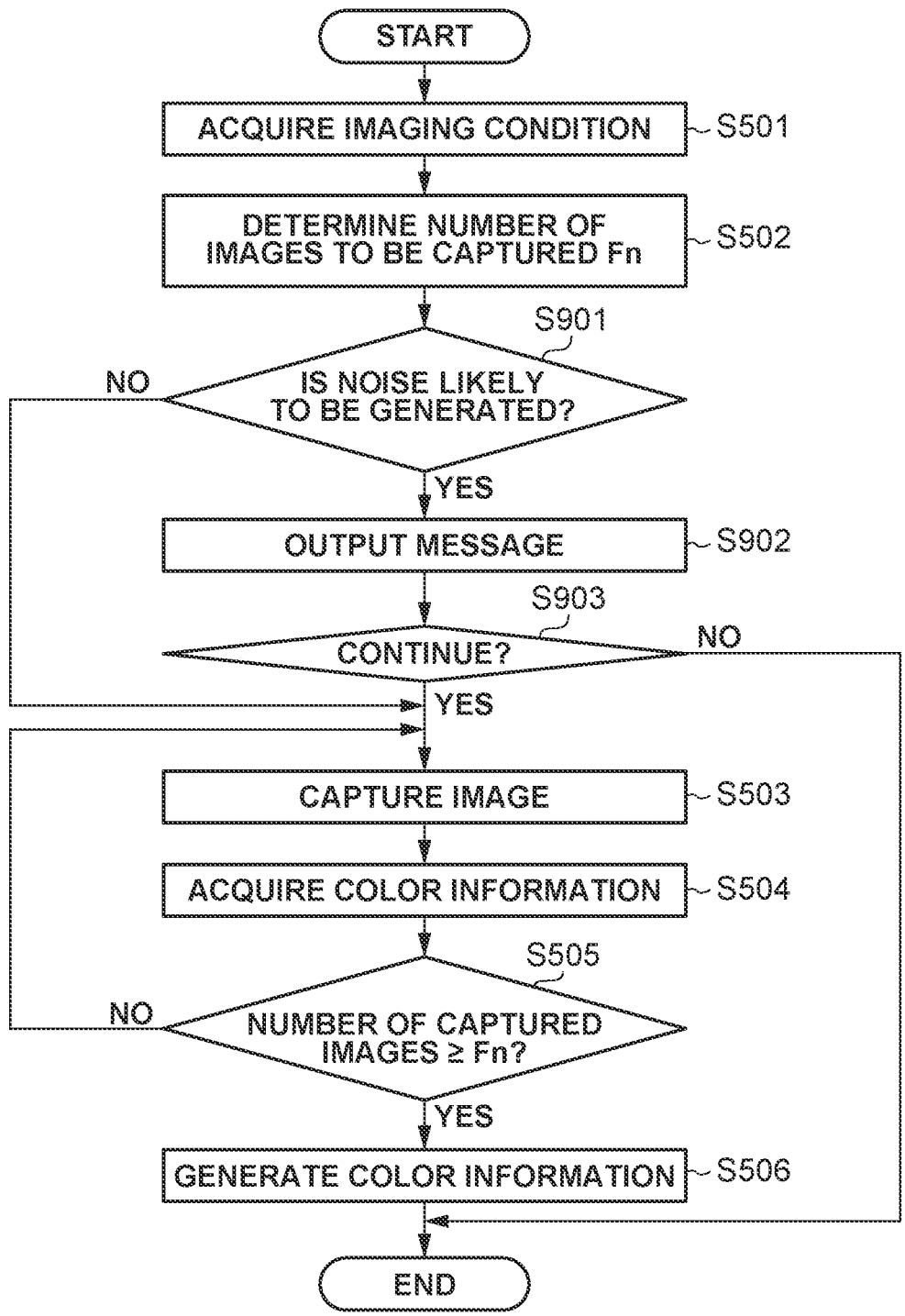
FIG. 12 is a flowchart illustrating a flow of a color information acquisition process according to the third exemplary embodiment.

Next, with reference to the flowchart in FIG. 12, the details of the processes of steps S1002 and S1006 in FIG. 11 are described. In steps S1002 and S1006 in FIG. 11, the camera that captures images for use in generating color information is either of the reference camera 100A and the correction target camera 100B. Similar processing is performed no matter which of the reference camera 100A and the correction target camera 100B is the camera. Thus, the reference camera 100A and the correction target camera 100B are referred to simply as a "camera" without identifying the reference camera 100A and the correction target camera 100B. With reference to FIG. 12, only processing steps different from FIG. 5 are described. In the flowchart in FIG. 12, after the process of step S502, the processes of steps S901 to S903 are performed, and then, the processing proceeds to the processes of step S503 and the subsequent steps.

After step S502, then in step S901, based on the imaging condition acquired in step S501, the condition acquisition unit 311 determines whether it is highly likely that much noise is generated in images. With reference to the example of FIG. 6B, for example, if the quantization parameters as the imaging condition are greater than or equal to 40, the condition acquisition unit 311 determines that it is highly likely that noise is generated. Then, if the condition acquisition unit 311 determines that it is highly likely that noise is generated (Yes in step S901), the processing proceeds to step S902. If, on the other hand, the condition acquisition unit 311 determines that it is not highly likely that noise is generated (No in step S901), the processing proceeds to step S503.

In step S902, the message generation unit 330 generates message information indicating that it is highly likely that much noise is generated and it becomes difficult to acquire color information, i.e., message information indicating that noise is generated and it is difficult to obtain effective data. Then, the message generation unit 330 outputs the message information to the display device 210.

This enables the user to recognize that in the current imaging condition, noise is generated and it is difficult to obtain effective data.

Further, in step S902, the message generation unit 330 generates message information for inquiring whether to continue the processing in the current imaging condition. Then, the message generation unit 330 outputs the message information to the display device 210.

Next, in step S903, the message generation unit 330 determines whether an instruction to continue the processing is input by the user. If an instruction to continue the processing is input by the user (Yes in step S903), the processing proceeds to step S503. If, on the other hand, an instruction not to continue the processing is input by the user (No in step S903), the processing of the flowchart in FIG. 12 ends.

In the processes of step S503 and the subsequent steps, similarly to the above, the processes of acquiring an image and acquiring color information are performed. Then, the color information generated in the process of step S506 is output to the LUT generation unit 302.

As described above, according to the third exemplary embodiment, based on imaging conditions of cameras, if it is determined whether noise is likely to be generated, and further, it is determined that processing is to be continued, the processes of generating color information and generating an LUT are performed.

[Other Exemplary Embodiments]

Other exemplary embodiments are described below.

Figure 13A:
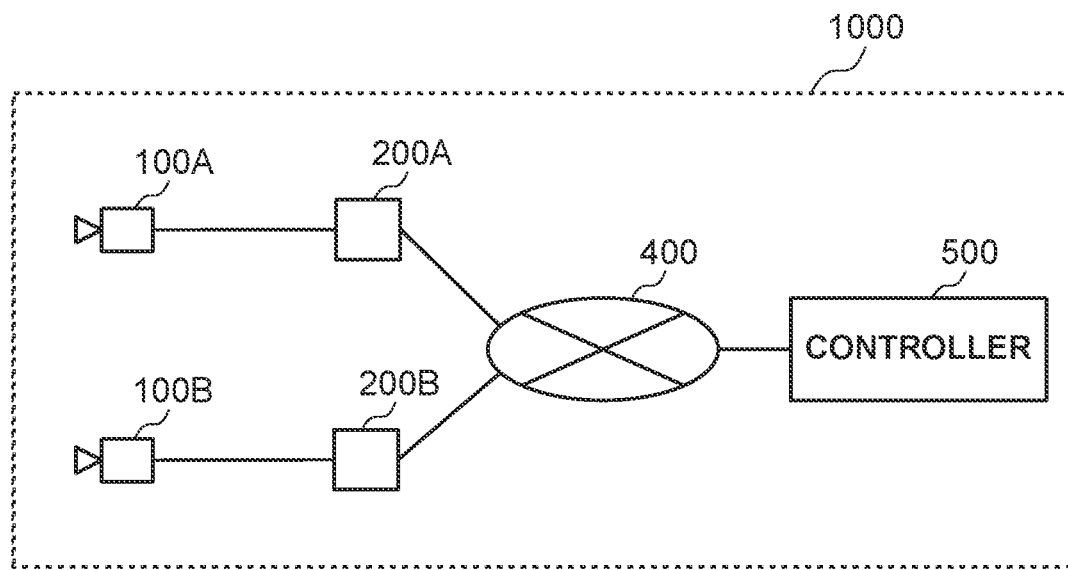
FIGS. 13A and 13B are diagrams each illustrating an example of a general configuration of a system according to another exemplary embodiment.
Figure 13B:
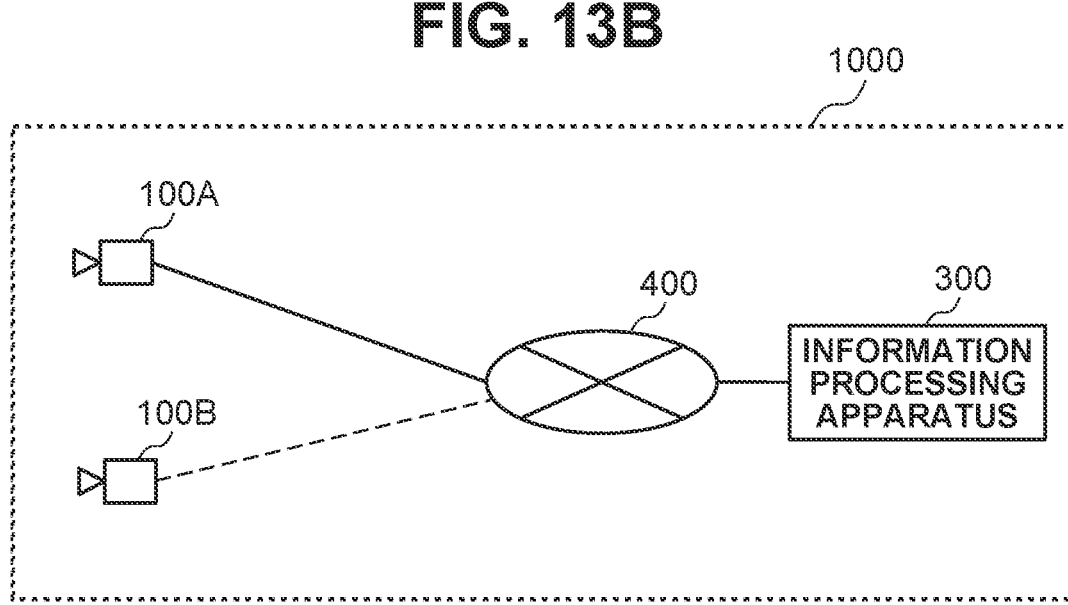

FIGS. 13A and 13B are schematic diagrams each illustrating an example of the configuration of an information processing system according to another exemplary embodiment.

FIG. 13A is a diagram illustrating an example of the configuration of an information processing system 1000 including an information processing apparatus 200A dedicated to receiving an output image from the camera 100A, and an information processing apparatus 200B dedicated to receiving an output image from the camera 100B. A controller 500 sets an imaging condition for each of the reference camera 100A and the correction target camera 100B. The information processing apparatus 200A acquires the imaging condition of the reference camera 100A, and the information processing apparatus 200B acquires the imaging condition of the correction target camera 100B. The information processing apparatuses 200A and 200B may acquire the imaging conditions of the cameras 100A and 100B, respectively, from the controller 500 via the network 400, or may acquire the imaging conditions of the cameras 100A and 100B from the cameras 100A and 100B connected to the information processing apparatuses 200A and 200B, respectively. The information processing apparatus 200A performs the processes of setting the number of images to be captured for the reference camera 100A, acquiring first images captured by the reference camera 100A, and generating first color information. The information processing apparatus 200B performs the processes of setting the number of images to be captured for the correction target camera 100B, acquiring second images captured by the correction target camera 100B, and generating second color information. Then, for example, the information processing apparatus 200B generates an LUT using the first color information and the second color information and applies the LUT to the correction target camera 100B. Alternatively, the information processing apparatus 200A may generate an LUT, and the information processing apparatus 200B may apply the LUT to the correction target camera 100B. Yet alternatively, the controller 500 as an external apparatus connected to the information processing apparatuses 200A and 200B may generate an LUT.

FIG. 13B is a diagram illustrating an example of the configuration of a system 1000 in a case where the cameras 100A and 100B are connected to the information processing apparatus 300 not by the cameras 100A and 100B connecting to the network 400 at the same time, but by the cameras 100A and 100B connecting to the network 400 one by one. In the system configuration illustrated in FIG. 13B, the flow of the entirety of processing performed by the information processing apparatus 300 is illustrated in a flowchart in FIG. 14.

In the flowchart in FIG. 14, after the process of step S402, the process of step S1201 is performed, and then, the processing proceeds to the processes of step S403 and the subsequent steps. In step S1201, the information processing apparatus 300 first switches the connection state between the network 400 and the cameras 100A and 100B to the state where the reference camera 100A is connected to the network 400. Then, if the processes of acquiring the imaging condition of the reference camera 100A, acquiring first images, and further generating first color information are performed, the information processing apparatus 300 makes a switching connection for changing the camera connected to the network 400 to the correction target camera 100B. Then, if the processes of acquiring the imaging condition of the correction target camera 100B, acquiring second images, and further generating second color information are performed, the information processing apparatus 300 generates an LUT based on the first color information and the second color information and applies the LUT to the correction target camera 100B.

The present disclosure can also be achieved by the process of supplying a program for achieving one or more functions of the above exemplary embodiments to a system or an apparatus via a network or a storage medium, and of causing one or more processors of a computer of the system or the apparatus to read and execute the program.

The present disclosure can also be achieved by a circuit (e.g., an application-specific integrated circuit (ASIC)) for achieving the one or more functions.

All the above exemplary embodiments merely illustrate specific examples for carrying out the present disclosure, and the technical scope of the present disclosure should not be interpreted in a limited manner based on these exemplary embodiments.

That is, the present disclosure can be carried out in various ways without departing from the technical idea or the main feature of the present disclosure.

According to the present disclosure, regardless of the recording modes of imaging apparatuses or the state of an object, it is possible to appropriately correct the difference in color between images of the imaging apparatuses.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors, circuitry, or combinations thereof (e.g., central processing unit (CPU), micro processing unit (MPU), or the like), and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)TM), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2021-190189, filed Nov. 24, 2021, which is hereby incorporated by reference herein in its entirety.

What is claimed is:

1. An information processing apparatus comprising:
   a parameter acquisition unit configured to acquire imaging parameters of a first imaging apparatus and a second imaging apparatus;
   a number-of-images determining unit configured to, based on the imaging parameters, determine a number of first images to be captured by the first imaging apparatus and a number of second images to be captured by the second imaging apparatus;
   a color information acquisition unit configured to acquire first color information included in the first images and second color information included in the second images;
   a generation unit configured to, based on the first color information and the second color information, generate color correction information for correcting a difference in color between the first and second images; and
   a storage unit configured to store correspondence relationship information indicating relationships between a plurality of imaging parameters and the number of images to be captured,
   wherein based on the imaging parameters, the number-of-images determining unit references the stored correspondence relationship information and determines the number of images to be captured.

2. The information processing apparatus according to claim 1, wherein the color information acquisition unit acquires the first color information and the second color information regarding an image area of an object included in common in the first and second images.

3. The information processing apparatus according to claim 2, wherein the color information acquisition unit generates as each of the first color information and the second color information a value obtained by acquiring an average pixel value of pixels in the image area with respect to each of as many images as the number of images to be captured and averaging the acquired average pixel values by the number of images to be captured.

4. The information processing apparatus according to claim 1, further comprising a color noise acquisition unit configured to acquire an amount of color noise included in the first color information and the second color information,
   wherein in a case where the amount of color noise exceeds a predetermined threshold, the number-of-images determining unit adds a predetermined number of images to the number of images to be captured.

5. The information processing apparatus according to claim 1, further comprising:
   an amount-of-noise acquisition unit configured to acquire an amount of noise included in the first and second images; and
   an adoption determination unit configured to, based on the amount of noise, determine whether to adopt the first and second images as images from which the color information acquisition unit is to acquire the first color information and the second color information.

6. The information processing apparatus according to claim 5, wherein in a case where the amount of noise is greater than or equal to a predetermined threshold, the adoption determination unit determines that the first and second images are not to be adopted.

7. The information processing apparatus according to claim 6, wherein in a case where the adoption determination unit determines that the first and second images are not to be adopted, the number-of-images determining unit adds a predetermined number of images to the number of images to be captured.

8. The information processing apparatus according to claim 7, wherein the number-of-images determining unit prevents the number of images to be captured from exceeding an upper limit number of images due to the addition of the predetermined number of images.

9. The information processing apparatus according to claim 5, wherein the amount-of-noise acquisition unit acquires an amount of block noise included in the first and second images.

10. The information processing apparatus according to claim 1, wherein the imaging parameters include any of an International Organization for Standardization (ISO) sensitivity, a shutter speed, a stop value, and an image recording parameter.

11. The information processing apparatus according to claim 10, wherein the image recording parameter includes either of an encoding method and an encoding parameter of an image.

12. The information processing apparatus according to claim 1, further comprising:
    a generation determination unit configured to, based on the imaging parameters, determine whether noise is likely to be generated in the first and second images; and
    an output unit configured to, in a case where it is determined that noise is likely to be generated in the first and second images, output message information for urging changes in the imaging parameters.

13. The information processing apparatus according to claim 1, wherein the generation unit generates a lookup table for the color correction information.

14. The information processing apparatus according to claim 1, further comprising a switching connection unit configured to switch a state where the information processing apparatus connects to the first imaging apparatus and a state where the information processing apparatus connects to the second imaging apparatus.

15. An information processing system comprising:
    a first information processing apparatus including a parameter acquisition unit configured to acquire an imaging parameter of a first imaging apparatus, a number-of-images determining unit configured to, based on the imaging parameter, determine a number of first images to be captured by the first imaging apparatus, and a color information acquisition unit configured to acquire first color information included in the first images;
    a second information processing apparatus including a parameter acquisition unit configured to acquire an imaging parameter of a second imaging apparatus, a number-of-images determining unit configured to, based on the imaging parameter, determine a number of second images to be captured by the second imaging apparatus, and a color information acquisition unit configured to acquire second color information included in the second images; and
    a storage unit configured to store correspondence relationship information indicating relationships between a plurality of imaging parameters and the number of first images and second images to be captured, wherein based on the first color information and the second color information, either of the first and second information processing apparatuses or an external apparatus connected to the first and second information processing apparatuses generates color correction information for correcting a difference in color between the first and second images; and wherein based on the imaging parameters, the number-of-images determining units reference the stored correspondence relationship information and determines the number of first images and second images to be captured.

16. An information processing method comprising:

acquiring imaging parameters of a first imaging apparatus and a second imaging apparatus;

based on the imaging parameters, determining a number of first images to be captured by the first imaging apparatus and a number of second images to be captured by the second imaging apparatus;

acquiring first color information included in the first images and second color information included in the second images;

based on the first color information and the second color information, generating color correction information for correcting a difference in color between the first and second images;

storing correspondence relationship information indicating relationships between a plurality of imaging parameters and the number of images to be captured; and based on the imaging parameters, referencing the stored correspondence relationship information and determining the number of images to be captured.

17. A storage medium that stores a program comprising:

acquiring imaging parameters of a first imaging apparatus and a second imaging apparatus;

based on the imaging parameters, determining a number of first images to be captured by the first imaging apparatus and a number of second images to be captured by the second imaging apparatus;

acquiring first color information included in the first images and second color information included in the second images;

based on the first color information and the second color information, generating color correction information for correcting a difference in color between the first and second images;

storing correspondence relationship information indicating relationships between a plurality of imaging parameters and the number of images to be captured; and based on the imaging parameters, referencing the stored correspondence relationship information and determining the number of images to be captured.

* * * * *